Figure 7:
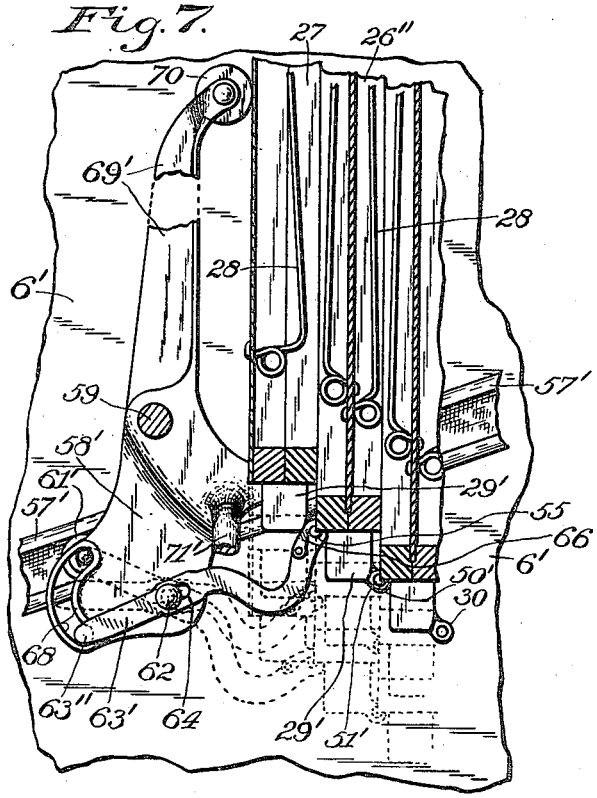

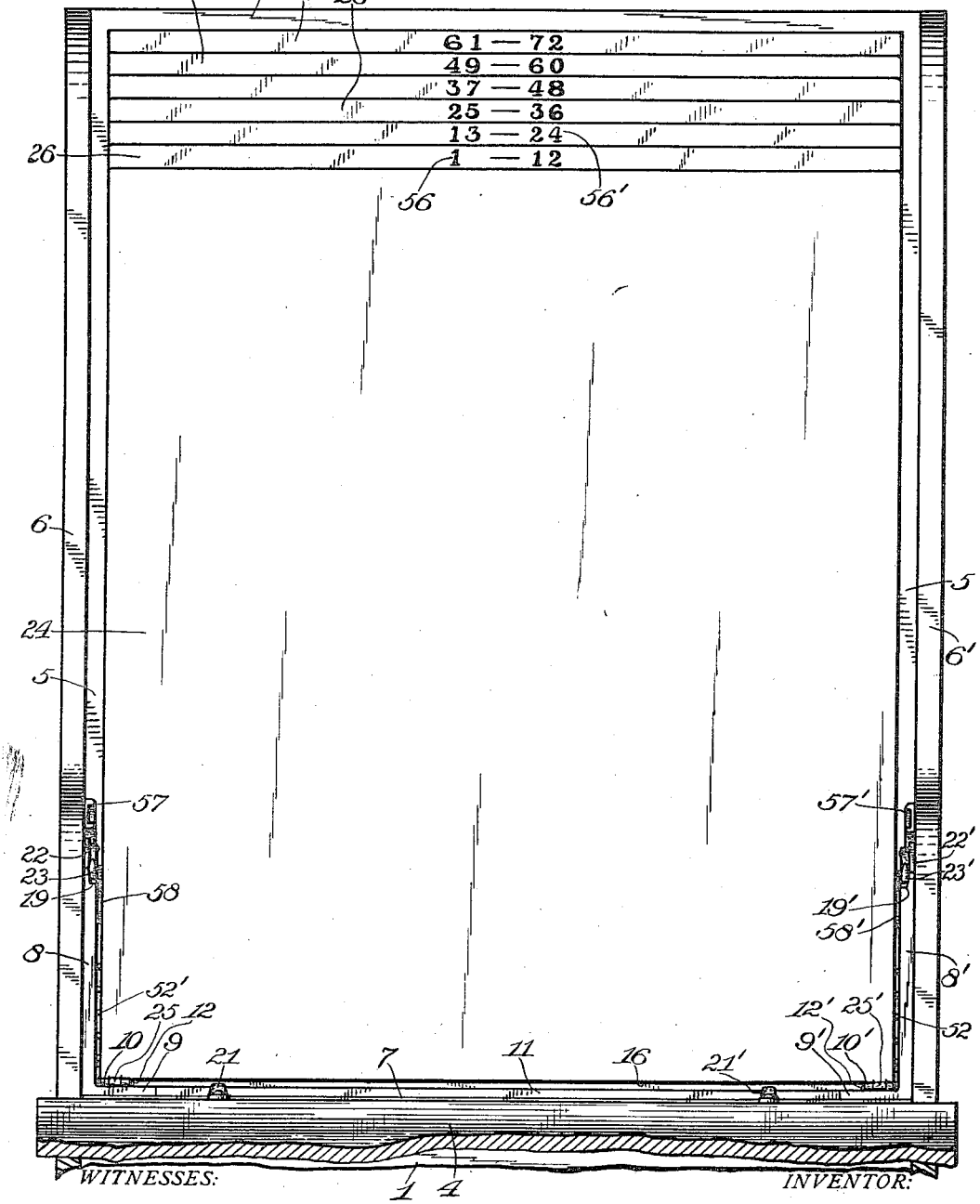

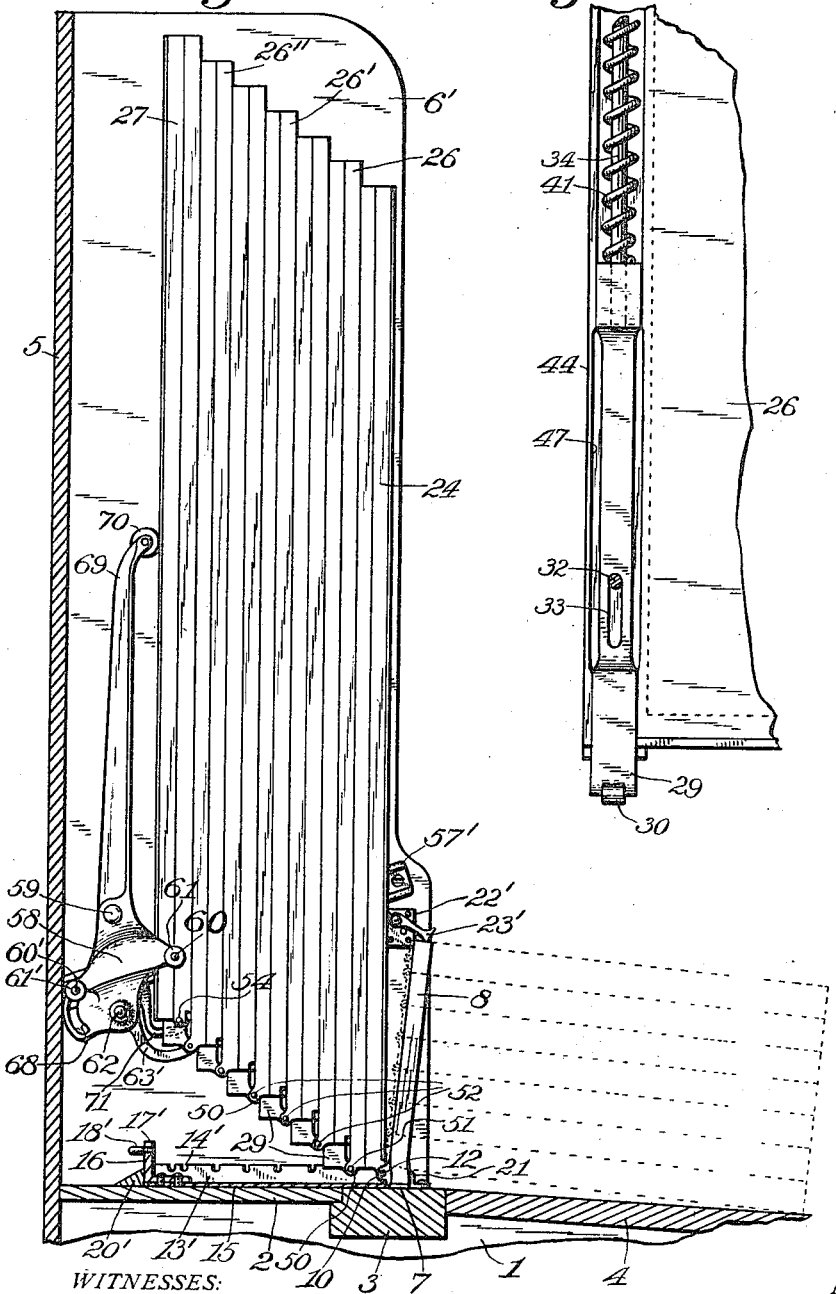
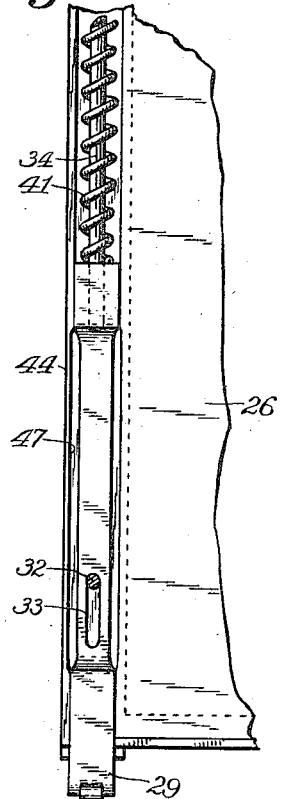
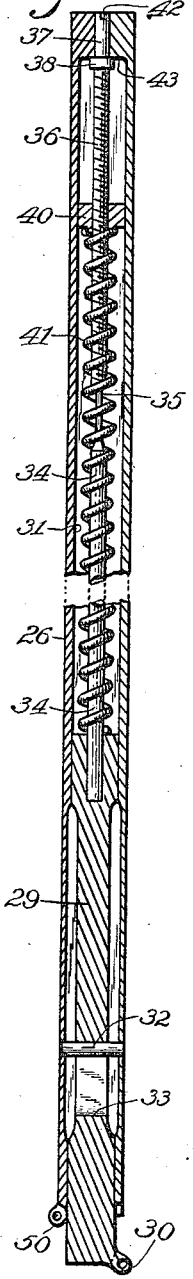

E. T. SILVIUS.
FILING APPLIANCE.
APPLICATION FILED OCT. 28, 1909.
1,075,866.
Patented Oct. 14, 1913.
6 SHEETS—SHEET 3.
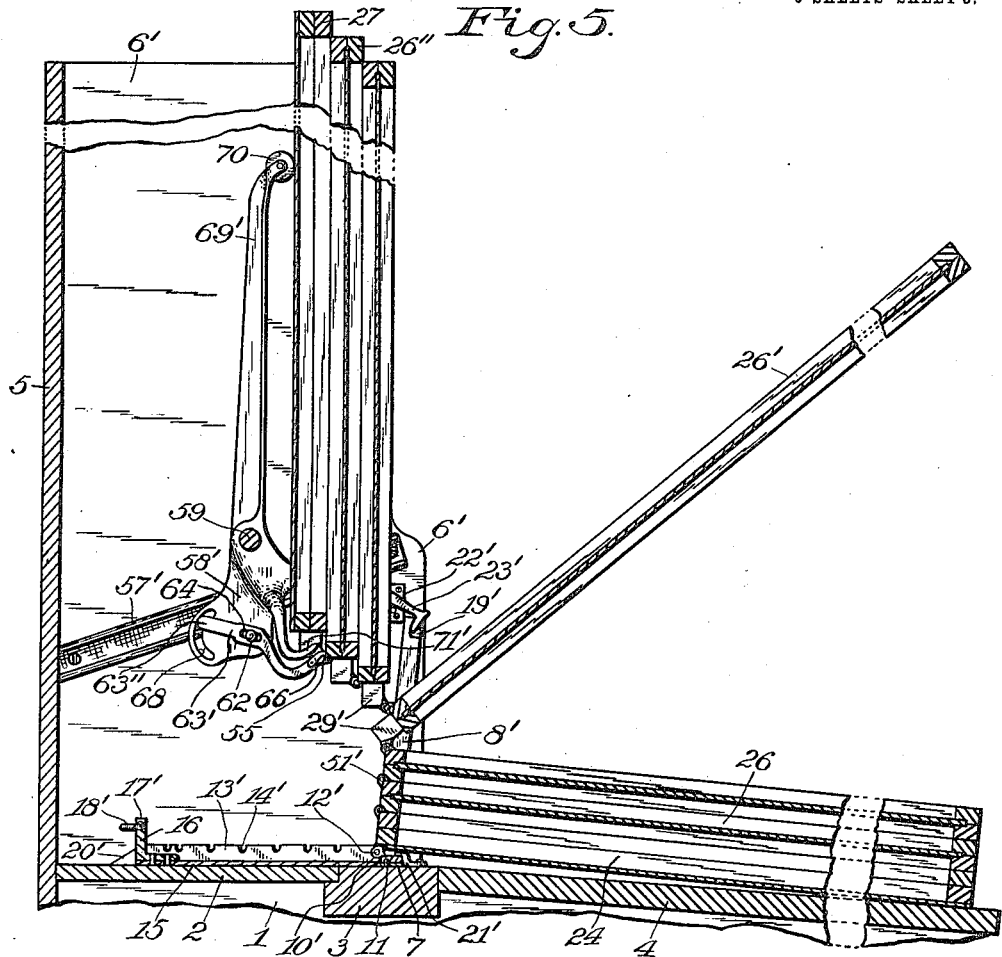
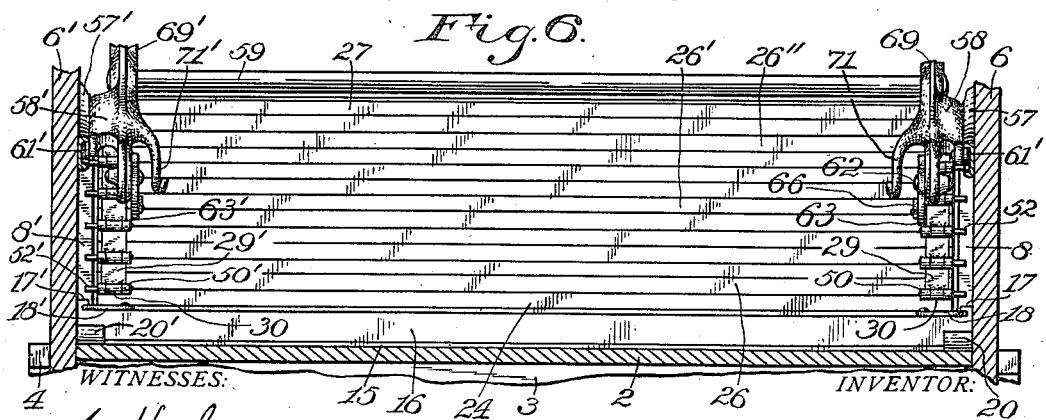

E. T. SILVIUS.
FILING APPLIANCE.
APPLICATION FILED OCT. 28, 1909.

1,075,866.

Patented Oct. 14, 1913.
6 SHEETS—SHEET 4.

WITNESSES:
J. H. Gardner
K. R. Woddell

INVENTOR:
Ellis T. Silvius.

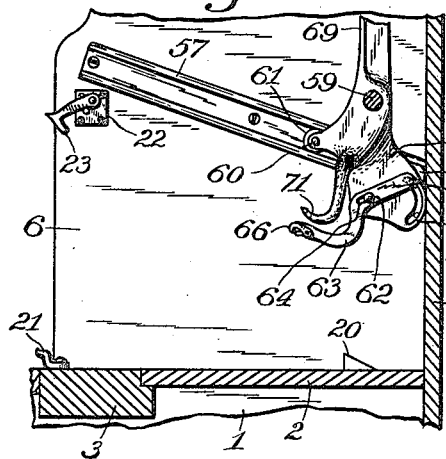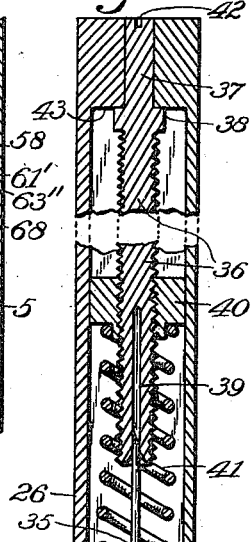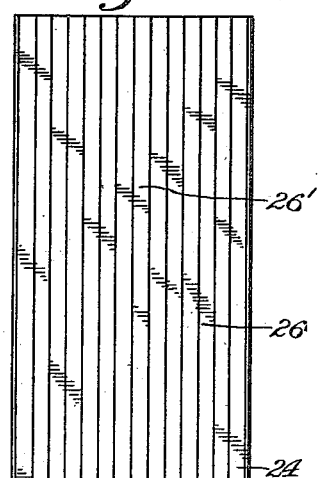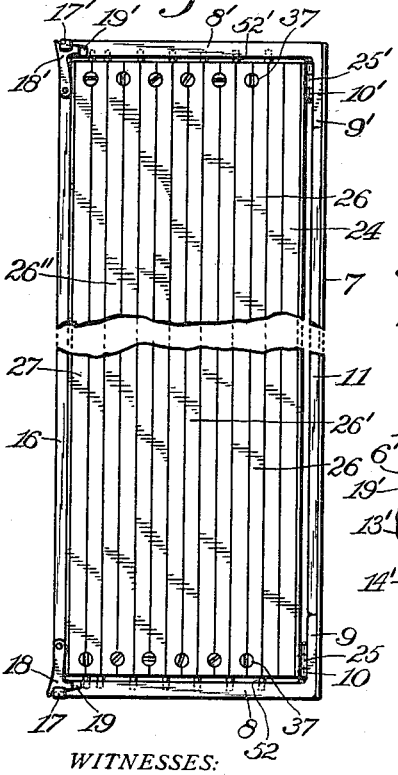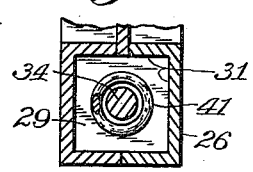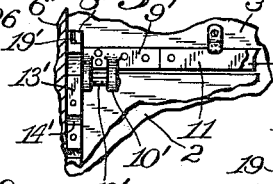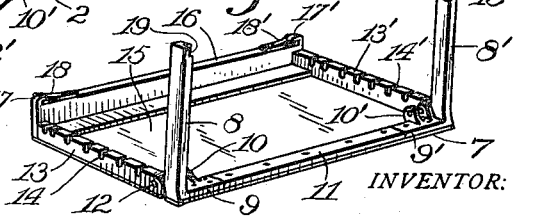

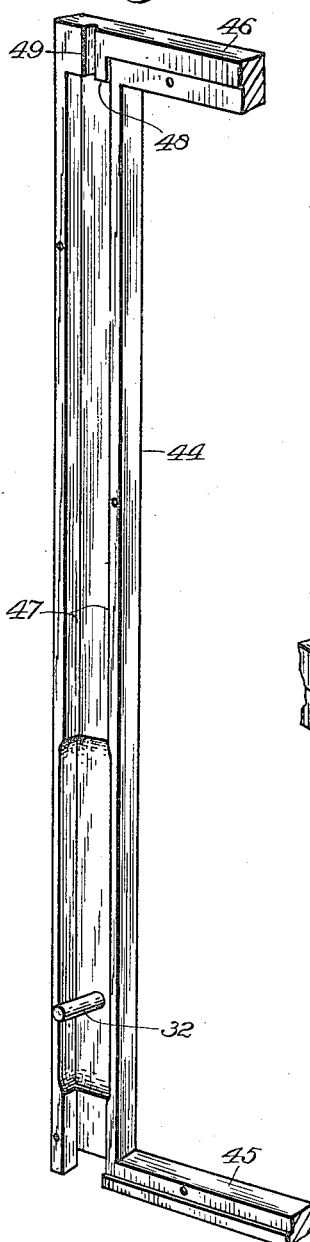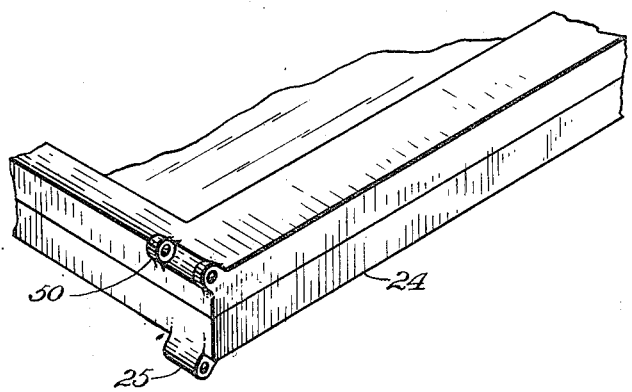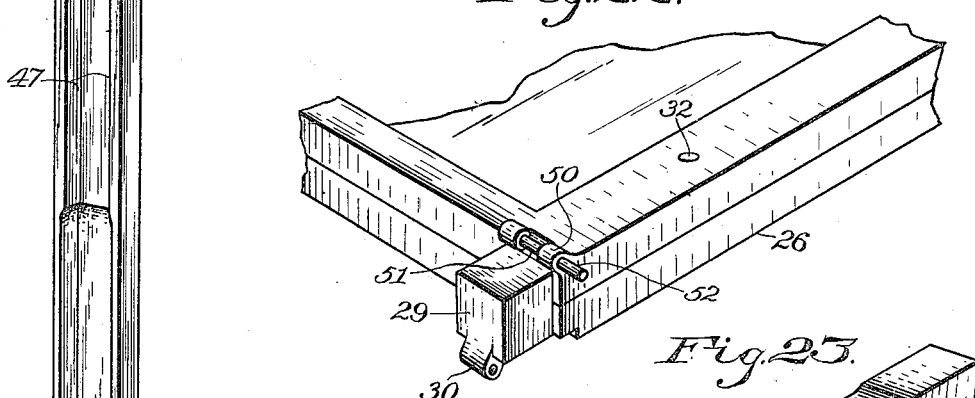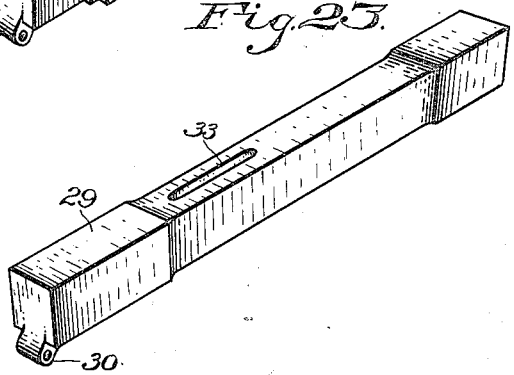

UNITED STATES PATENT OFFICE.

ELLIS T. SILVIUS, OF INDIANAPOLIS, INDIANA, ASSIGNOR TO THE McCASKEY REGISTER COMPANY, OF ALLIANCE, OHIO, A CORPORATION OF OHIO.

FILING APPLIANCE.

1,075,866.   Specification of Letters Patent.   Patented Oct. 14, 1913.

Application filed October 28, 1909. Serial No. 525,100.

*To all whom it may concern:*

Be it known that I, ELLIS T. SILVIUS, a citizen of the United States, residing at Indianapolis, in the county of Marion and State of Indiana, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to appliances in which papers of various kinds may be systematically filed, so as to be conveniently accessible, and especially such papers as are known as sales-bills, orders, etc.; the invention having reference more particularly to the holders or frames comprising the essential parts of filing appliances.

One object of the invention is to provide improved means for connecting the holders together in such manner as to enable them to be folded together in a rectangular pack, so as to be conveniently handled and placed in a vault or safe in the minimum amount of space, and so that when in operative position in their case they will normally stand upright in stepped order or in echelon with the upper ends of the rearward holders extending higher than the forward holders, so as to expose the index characters on the fronts of the upper end portions of the holders.

Another object is to provide improvements in shifting hinges or pivotal connectors for holders of the above-mentioned character, and to provide means whereby shifting hinges or connectors on holders shall be caused to automatically act so as to bring the upright stepped holders into a rectangular pack when drawn forward to prone position.

A still further object is to provide improved means for maintaining the upright holders in exact vertical positions during their movements forward or rearward while the forward holders are in operation.

With the above-mentioned and other objects in view the invention consists in a plurality of holders or frames, means connecting the holders or frames hingedly together and so as to be movable relatively one to another in longitudinal direction, means for yieldingly supporting the normally rearward holders in upright positions in higher planes than forward holders, and means acting to move the holders relatively and automatically when the holders are drawn to prone positions, so as to form them into a rectangular pack, the invention consisting further in improved means for maintaining the upright holders in accurate vertical positions; the invention consisting still further in an improved supporting base for the holders; and the invention consists also in the novel parts, and in the combinations and arrangements of parts, as hereinafter particularly described and then defined in the accompanying claims.

Figure 8:
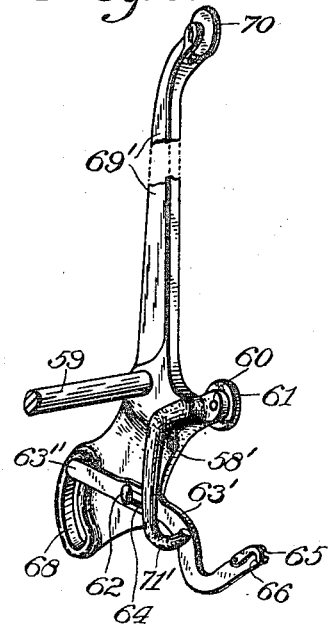
Figure 9:
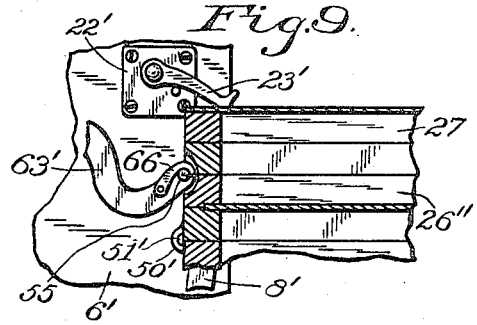
Figure 10:
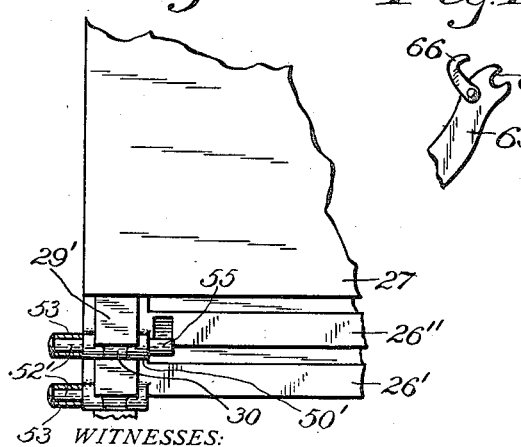
Figure 11:
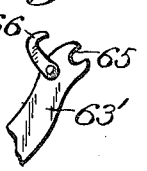
Figure 12:
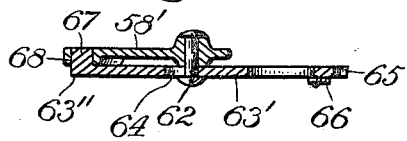

Referring to the drawings, Figure 1 is a front elevation of the improved filing appliance in which the well known desk portion of the case thereof is broken away; Fig. 2, a vertical section of the case in which the holders are shown in normal position, and in broken lines are represented as being in a rectangular pack in prone position, the plane of the section being at the inner side of the left hand side of the case; Fig. 3, a fragmentary detail showing parts of one of the holders; Fig. 4, a sectional view of one of the holders showing one of the yielding supports thereof; Fig. 5, a fragmentary vertical sectional view in a plane near the right hand side of the appliance; Fig. 6, a fragmentary vertical section looking forward on a plane near the back of the case with the holders in prone position, and the abutment against which the holders normally rest disconnected therefrom; Fig. 7, a fragmentary vertical section showing a number of the holders in normal position in connection with their supporting abutment, broken lines indicating various positions the holders assume with respect to the abutment during movements of the forward holders; Fig. 8, a fragmentary perspective view of parts of the abutment; Fig. 9, a fragmentary sectional view showing details of parts whereby the holders are connected to the abutment; Fig. 10, a fragmentary rear elevation of the holders in normal positions; Fig. 11, a side view of a part of the device for connecting the holders to the abutment; Fig. 12, a horizontal section showing details of the device for connecting the holders to the abutment; Fig. 13, a fragmentary vertical section of the case and the abutment; Fig. 14, a fragmentary sectional detail of one of the holders; Fig. 15, a side elevation of the holders on their supporting base removed from the case and in condition for handling and to be placed in a safe or vault for safe keeping; Fig. 16, a fragmentary top plan of the holders arranged as in Fig. 15; Fig. 17, a fragmentary sectional detail of one of the holders; Fig. 18, a fragmentary detail showing parts of the base of the holders; Fig. 19, a perspective view of the base of the holders; Fig. 20, a fragmentary perspective view showing one of the parts of which a holder is preferably composed; Fig. 21, a fragmentary perspective view of the foremost one of the holders; Fig. 22, a fragmentary perspective view of one of the intermediate holders; and Fig. 23, a perspective view of one of the hinge-bars for yieldingly supporting the intermediate and rearmost one of the holders.

Similar reference characters throughout the drawings indicate corresponding elements or features of construction referred to herein.

In constructing registers or filing appliances of the above-mentioned character it is customary to provide a case in which the holders are removably mounted, the case having a base part 1 which may be adapted to serve as a writing desk, the rear top portion 2 and rail 3 of the desk part serving to support the base of the holders, and the top 4 of the base part supporting the holders when in prone position, the case comprising also a back 5 and two sides 6 and 6'. The case, of course, may be variously constructed as may be desired.

In practically carrying out the objects of the present invention the foremost one of the holders is permanently hinged or pivoted to a base which preferably comprises a plate 7 adapted to rest horizontally and having two upright guide bars 8 and 8' on its opposite ends, the guide-bars preferably having each a foot 9 or 9' by which it is attached rigidly to the plate, the feet having hinge-jaws 10 and 10' thereon for supporting the foremost holder, a stiffening bar 11 preferably being secured to the plate 7. With this construction the plate 7 and the bar 11 may be made of any desired length to conform to the width of the case, cases of different widths being required by different users. The hinge-jaws are provided with hinge-pins 12 and 12' whereby a pair of bars 13 and 13' are hinged to the outer sides of the jaw, the bars having notches 14 and 14' in the normally upper sides thereof, and their under sides have a base plate 15 attached thereto. A bar 16 is attached to the base-plate 15 and also to the bars 13 and 13', all constituting parts of the base for supporting the holders when removed from their case. The bar 16 has lips 17 and 17' on its ends, and a pair of hooks 18 and 18' are pivotally mounted on the top of the bar 16, so as to pass under and beyond the lips toward the guide-bars 8 and 8', the base-bars 13 and 13' being movable pivotally up to the rear sides of the guide-bars, and the upper ends of the guide-bars have recesses 19 and 19' therein to receive the ends of the hooks for latching the guide-bars upon the tops of the bars 13 and 13'. The horizontal board 2 comprising the bottom of the case in which the leaves are mounted is provided with two stops 20 and 20' against which the base for the holders is placed when supported on the bottom of the case, and a pair of buttons 21 and 21' are mounted on the rail 3 to secure the base for the holders in the case removably. In order to assist in firmly holding the guide-bars 8 and 8', their upper ends are in contact with pivot plates 22 and 22' that are secured to the inner sides of the case sides 6 and 6' and have hooks 23 and 23' mounted thereon and adapted to enter the recesses 19 and 19'.

Any suitable number of holders may be employed, there being a front holder 24 having hinging ears 25 and 25' on the forward part of one end thereof that are connected to the hinge-pins 12 and 12'. A group or set of holders includes a suitable number of intermediate holders, as 26, 26', 26", all being alike in construction, and a rear holder 27 which usually is similar to the front holder, but reversed with respect thereto. The holders are suitably adapted to hold papers, bills or bill slips removably thereon, being usually provided with well known types of bill clips 28 for supporting bill-slips against the holders. Each one of the holders excepting the front holder is provided with two hinge-bars 29 and 29' that extend from one end of the holder a suitable distance toward the opposite end of the holder in the side portions of the holders which are hollow, the outer ends of the hinge-bars having hinging ears 30 and 30' thereon, said hollow portions of the holders being designed to afford guideways 31 that permit the hinge-bars to move longitudinally, but prevent rotation thereof. Each holder is provided with stop-pins 32 that extend through the guideways, each stop pin extending through a slot 33 with which each hinge-bar is provided to limit the longitudinal movement of the hinge-bars or movement of the holder with respect to the hinge-bars. Each hinge-bar is provided on its inner end with a guide-rod 34 which in turn has a relatively smaller extension 35. A screw 36 is mounted in the outer end portion of each guide-way and has a journal 37 thereon which is suitably mounted to rotate in the free end of the holder beyond the guideway, the screw having a collar 38 thereon adjacent to the journal, and the inner end of the screw has a guide-bore 39 therein receiving the extension 35 of the guide-rod 34. The screw 36 extends through a nut 40 which may move in the guideway 31, but is thereby prevented from rotating, and a coil-spring 41 is seated against the inner end of the hinge-bar and also against the nut, the spring being guided by the screw and the rod 34. The outer end of the journal 37 has a groove 42 therein to receive a screw driver, and the collar 38 is in contact with a shoulder 43 formed at the end of the guideway 31, so that the tension of the spring may be adjusted as may be desired to project the hinge-bar forcibly beyond the hinging end of the holder. The springs as will be seen are relatively long with respect to the length of the leaf and they may be of any required strength, it being preferable that the springs in the forward holders be capable of supporting greater loads than those in the rearward holders, and it will be seen that the springs may be independently adjusted as may be required to carry the loads which vary on different holders and on different sides of either leaf.

It is obvious that the holders may be variously constructed in detail and the frames thereof built up of separate parts as is customary, so that the guideways for the hinge-bars may be formed economically. In Fig. 20 is illustrated one part of the frame of a holder as preferably constructed and comprising a channel-bar 44 having lateral bars 45 and 46 on its ends, the channel-bar having a channel 47 in one side thereof extending from one end nearly to the opposite end at which the shoulder 48 is formed, from which extends a groove 49 to form a part of the bearing for the journal 37. Two of the frame parts of similar construction are placed together so that the two channels 47 form a guideway 31. This expedient being well known requires no further description.

The hinge-bars 29 and 29' are so arranged that the hinge ears thereof are located in the plane of the forward side of the holder, and the rear side of each holder excepting the rearmost holder is provided with hinging jaws 50 and 50' and hinge-pins 51, 51', the hinging ears 30 of the hinge-bars being connected to the hinging-jaws of the next forward adjacent holders by the hinge-pins, the hinge-pins extending beyond the side edges of the holders to constitute guide-pins 52 and 52' that are adapted to engage the rear sides of the guide-bars 8 and 8' when the holders are drawn forward, for the purpose of forcing the holders toward the hinge-pins that connect their hinge-bars to the adjacent forward holders, the guide pins preferably having rollers 53 thereon as indicated in Fig. 10. It should be understood that the guide-pins are not required at the rear side of the front holder, and there being no hinge-pins required at the rear side of the rear holder 27, the rear leaf is provided with separate guide-pins 54 that are adapted to engage the guide-bars 8 and 8' for drawing the holder or stopping its movement forward while its hinge-bars are drawn forward by the holder to which they are connected. It should be understood that the guide-pins 52, 52' may be otherwise provided and arranged than as described, but it is clear that they may be advantageously composed of the end portions of the hinge-pins. The hinge-pins of the hinge-bars of the rear holder 27 extend inward, each toward the other, and the extensions thereof constitute pivot pins 55 at the inner sides of the hinging jaws of the holders. The holders excepting the front holder have index characters, as 56, 56', on the forward side of their normally upper end portions that are visible to the attendant at the front of the register, so that he may promptly select and draw forward any one of the holders to have access to the papers filed thereon or to place other papers on the holder.

A pair of grooved guides 57 and 57' are mounted fixedly on the inner sides of the sides 6 and 6' of the case and are inclined to a suitable degree with their forward ends higher than their rear ends. An abutment is mounted movably on the guides and comprises two main members 58 and 58' having a horizontal bar 59 attached thereto, each main member being provided with a pair of guide-pins 60 and 60' on which rollers 61 and 61' are preferably mounted and adapted to run in the grooves of the inclined guides whereby the abutment is suitably guided. Each main member is provided with a guide-pin 62 that projects from its inner side, and a pair of arms 63 and 63' having each a longitudinal slot 64 between its ends are mounted on the guide-pins, the latter extending through the slots so that the arms may move pivotally and also longitudinally on the guide-pins. The forward end of each arm has a recess 65 therein to receive the pin 55 and it is provided with a hook 66 adapted to engage the pin 55 and hold the arm in connection therewith, whereby the hinge-bars of the rear leaf are connected to the abutment. The rear ends 63'' of the arms have each a projection 67 on the outer side thereof that extends into a curved guideway 68 with which each main member of the abutment is provided, the curvature of the guideways being so planned as to maintain the abutment at an unvariable distance rearward of the rear holder during vertical movements of the holder when the other holders are in motion. The abutment has a pair of standards 69 and 69' thereon that extend upward behind the rear leaf and have each a roller 70 mounted on its upper end to engage the back of the rear holder 27, the holder normally being in contact with the roller and maintained in vertical position by the abutment.

Preferably the abutment is provided with two arms or projections 71 and 71′ that extend forward so that the rear holder 27 may come in contact therewith when all the holders are in normal upright position, in order to relieve the supporting springs of the holders when the register is not in use, especially in case the holders become overloaded with papers, the holders thus being maintained in uniform stepped order while in normal position independently of the supporting springs thereof, as it is clear that the intermediate holders would collectively be suspended on the rear holder in the absence of their supporting springs.

The holders normally stand as illustrated in Figs. 1 and 2, being in stepped order as described, the force of gravity having a tendency to push the abutment rearward, which, however, is prevented by the coupling arms 63 and 63′. When a number of the holders are drawn forward to prone position the rear holder rises with respect to the abutment, and if the coupling arms 63 and 63′ were pivoted to the abutment the latter would be pushed rearward from the rear holder, but this is prevented by reason of the fact that the curved guideways 68 cause the coupling arms to be drawn rearward when they are approaching the horizontal positions, and forward again so as to virtually lengthen the arms when in inclined positions, which will be clear by reference to Figs. 5 and 7. When the holders are all in prone position it will be seen they lie in a rectangular pack, which is caused by the guide-pins 52 and 52′ engaging the guide bars 8 and 8′ and drawing the holders toward their supporting hinges as they are moved down to prone position. When the holders are lifted from prone position the supporting springs thereof act not only to move the holders upward or away from their supporting hinge-pins, but also to swing the holders upward to their normal positions by reason of the contact of the guide-pins with the guide-bars, as will be readily understood. When the holders are in prone position the abutment may be disconnected therefrom, then the hooks 23 and 23′ may be disconnected from the guide-bars 8 and 8′ after which the base for the holders may be swung up against the hinged ends of the holders, and the hooks 18 and 18′ may be connected to the guide-bars 8 and 8′, after which the group of holders may be removed from the case and placed upright on their supporting base, the buttons 21 and 21′, of course, having been previously turned to release the base before drawing the holders forward. The holders may then be readily handled in compact order and suitably placed at night for safe keeping.

Having thus described the invention, what is claimed as new, is—

1. The combination with a support, of a series of holders, pivotal connections between the holders, whereby said holders may be swung relatively to each other, the said connections including a series of members, one for each holder, on which the holders are longitudinally movable toward and from their respective pivots, and means for moving the holders on said members.

2. The combination with a support, of a series of holders, pivotal connections between the holders, whereby said holders may be swung relatively to each other, the said connections including a series of members, one for each holder, on which the holders are longitudinally movable toward and from their respective pivots, yieldable means interposed between each of said holders and the adjacent member, and means for moving the holders on said members.

3. In a filing appliance the combination of a series of holders for supporting papers or slips, pivotal connections between each holder and the adjacent holder or holders permitting them to swing relative to each other and operating to move the lower end of the rearward holders forwardly and rearwardly, the said connections including connectors having pivots and means which permit each holder to move longitudinally of the adjacent connector, and means for moving each holder longitudinally of the adjacent connector during its operation.

4. In a filing appliance the combination of a series of holders for supporting papers or slips, pivotal connections between each holder and the adjacent holder or holders permitting them to swing relative to each other and operating to move the lower end of the rearward holders forwardly and rearwardly, the said connections including connectors having pivots and means which permit each holder to move longitudinally of the adjacent connector, and means for moving each holder longitudinally during the operation thereof when the holder is swung in one direction, and separate means for moving each holder to normal position when swung in the opposite direction.

5. A plurality of normally upright rotatable holders arranged in echelon and each movable longitudinally relatively to its rotative axis, the foremost one supporting the remaining holders, and means for automatically moving the holders longitudinally during rotative movements thereof.

6. A plurality of holders each provided with guideway and a hinging ear, a hinge bar mounted movably in the guideway for each holder and having a hinging ear thereon to be connected to the hinging ear of an adjoining holder, yieldable supporting means between each holder and the adjacent hinge bar, and stops for limiting the yielding movement relatively to the hinge-bars.

7. A plurality of holders having each a plurality of hinge-bars yieldingly connected elastically thereto and yieldingly supporting the holders uprightly in echelon, the hinge-bars of each holder being hingedly connected to an adjacent holder and normally supported thereby, and means with which the holders coöperate during movements on the hinges to prone position for collocating the holders in a rectangular pack.

8. A plurality of normally upright rotatable holders arranged in echelon, the foremost one of the holders being pivotally supported and the remaining holders being provided with elastically yielding hinging devices connecting the holders together and permitting them to move relatively to each other longitudinally, and stationary means arranged in the path of movement of the holders for moving them longitudinally relative to each other as they are operated to the prone position.

9. A plurality of holders each including side-bars formed with guideways therein and provided with hinging ears on one side thereof, hinge-bars movable in the guideways and each having a hinging ear thereon in the plane of the opposite side of the holder for connection with the hinging ears of the adjoining holder, springs in the guideways normally forcing the hinge-bars to project beyond the guideways, and stops for limiting the movement of the hinge-bars.

10. A plurality of normally upright holders rotatably supported in echelon, a pair of stationary upright guide-bars arranged to be engaged by all excepting the foremost one of the holders in succession when rotating forward to prone position, to move the holders toward their rotating axes, and means coöperating with the holders and the guide-bars, when the holders rotate from prone position, to move the holders to upright position and away from their axes to collocate the holders in echelon.

11. A leaf-base including a main part having two guide-bars rigid thereon and a secondary part hinged to the main part to be moved to the guide-bars, a plurality of connected holders of which one is pivoted to the main part of the leaf-base and supports the remaining holders pivotally, the remaining holders having projections thereon to be moved into contact with the guide-bars, and means for latching the secondary part to the guide-bars.

12. A plurality of upright holders having each a plurality of hinge-bars hinged thereto, each pair of hinge-bars having one of the holders mounted thereon to move longitudinally, springs in the holders seated on the hinge-bars, adjusting-nuts movable in the holders and seated on the springs, adjusting-screws mounted in the holders and engaging the adjusting-nuts, stops for limiting the movement of the holders on the hinge-bars, and guides to be engaged by the holders, when moved to prone positions, for compressing the springs and moving the holders toward the hinging axes of the holders.

13. A plurality of holders each having longitudinally extending guideways therein, hinging ears on one side of the holder, hinge-bars mounted to move longitudinally in the guideways and having hinging ears thereon adapted to be connected to the hinging ears that are on adjoining holders, stops in the guideways limiting the movement of the hinge-bars, guide-rods on the hinge-bars, adjustable abutments in the guideways, springs on the guide-rods engaging the hinge-bars and the abutments, and means for adjusting the abutments to increase or decrease the tension of said springs.

14. A base, a plurality of holders of which one is pivotally mounted on the base and supports the remaining leaves, the remaining holders having each a plurality of hinging bars that are pivoted to the adjacent holders, the remaining holders being movable on the hinge-bars and provided each with a plurality of springs whereby the holders are yieldingly supported on the hinge-bars in upright position, and a pair of guide-bars mounted on the base to be engaged by the yieldingly-supported holders when pivotally moved to prone position to move the holders on the hinge-bars.

15. A case, a pair of guides secured to the case, a plurality of connected holders mounted uprightly to rotate in the case, the rearward holders being movable vertically bodily and also forward or rearward bodily with rotation of the forward holders, an abutment mounted movably on the guides behind the rearmost holder and having coupling arms mounted movably thereon, the arms connecting the abutment with the rearmost holder and mounted to move pivotally and also longitudinally forward or rearward relative to the abutment, and means for guiding the arms forward or rearward relatively to the abutment during pivotal movement thereof.

16. A case, a pair of guides secured to the case, a plurality of holders mounted in the case, connections between the holders for pivotally connecting them together and permitting them to swing relatively to each other, the foremost one of the holders being pivotally supported and pivotally supporting and carrying the remaining holders uprightly, the said connections including means permitting the remaining holders to move toward or from their supporting pivots and normally supporting them uprightly in stepped relationship to each other, means arranged in the path of movement of said holders for moving the holders toward their pivots when moving pivotally to prone positions, and an abutment mounted movably on the guides behind the rearmost holder and provided with a projection extending under the rearmost holder when in normal position to prevent the holders from moving toward their pivots.

17. A case, a base secured fixedly in the case and having two upright guide-bars thereon, two latching devices mounted in the case and coöperating with the upper end portions of the guide-bars to hold the guide-bars fixedly, and a plurality of holders, the foremost one of the holders being pivotally mounted on the base and pivotally supporting the remaining holders uprightly in echelon, all the leaves excepting the foremost one being movable toward their supporting pivots and each having projections thereon to be carried thereby into contact with the guide-bars, for moving the holders toward their pivots during pivotal movement thereof forward to prone position.

18. A case, a plurality of normally upright holders connected together to move rotatively, the foremost one of the holders being rotatably supported in the case and the forward holders when moving rotatively acting to move the rearward holders bodily, a pair of guides mounted in the case, a back support movably mounted on the guides and normally in contact with the rearmost one of the holders, a coupling arm mounted on the support to rock and to also move longitudinally forward or rearward and connected with the rearmost one of the holders, and guiding means for moving the arm longitudinally while rocking during vertical movements of the holders, the rearward holders moving vertically in arcs while forward holders move rotatively.

19. A main base provided with a pair of upright guide-bars, a plurality of holders connected one to another to move rotatively, one of the outermost holders being mounted rotatively on the base and normally supporting the remaining holders uprightly in echelon, the remaining holders having elastically-yielding hinging devices whereby they are supported directly by the adjacent holders, the said remaining leaves having each a pair of guide-pins thereon to engage the guide-bars when the holders are moved to prone position to collocate the holders in a rectangular pack, a secondary base hinged to the main base to swing up to the holders and the guide-bars, and means for latching the secondary base to the guide-bars.

20. A pair of stationary pivot-bearings, a pair of upright stationary guide-bars adjacent to the pivot-bearings, a plurality of holders arranged in a group to normally stand upright, the foremost one of the holders being pivotally mounted in the pivot-bearings, the remaining holders being mounted on the next adjacent forward holders to rotate and to also move toward or from their rotative axes and having guide-pins on their sides to be moved into contact with the guide-bars during rotative movement of the holders toward prone position to move the holders toward their axes, and springs acting, when the guide-pins are in contact with the guide-bars, to rotatively move the holders to upright position and to move all excepting the foremost one of the holders away from their axes.

21. In a filing appliance, the combination of a plurality of holders, adjustable pivotal devices connecting the holders together, the devices normally supporting the leaves uprightly and permitting pivotal movement to prone position, with compression means for automatically adjusting the devices to collocate the holders in echelon when upright, and means for automatically readjusting the devices to collocate the holders in a rectangular pack when moved to prone position.

22. In a filing appliance, the combination of a plurality of holders, one of the holders having hinge pins thereon, the next adjacent one of the holders having hinging members connected adjustably thereto, the members being connected to the hinge pins of the adjacent holder, with spring operated means coöperating with the hinging members and the holders to which they are adjustably connected for normally holding the members in one state of adjustment and permitting re-adjustment thereof.

23. In a filing appliance, the combination of a supporting case, a plurality of holders having hinge pins thereon and having also hinging members connected adjustably thereto, the hinging members being connected to the hinge pins of adjacent holders, the holders being normally supported in the case in upright position and movable pivotally to prone position, with means for automatically adjusting the hinging members to collocate the holders in echelon when in upright position, and means for readjusting the hinging members to collocate the holders in a rectangular pack when in prone position.

24. In a filing appliance, the combination of a case, guide devices mounted in the case, a plurality of holders of which one is pivotally supported in the case, the remaining holders having each a plurality of hinging members adjustably connected thereto, the members being pivotally connected to adjacent holders, means enabling the hinging members to support the holders to which they are connected in echelon, and means movable into engagement with the guide devices for re-adjusting the hinging members to collocate the holders in a rectangular pack.

25. In a filing appliance, the combination of a main base part having a pair of guide-bars thereon, a plurality of holders provided with adjustable hinging connections, one of the holders being pivotally connected to the base part, means for adjusting the connections to one relative position, means connected with the remaining holders and movable into engagement with the guide-bars for re-adjusting the connections to another relative position, and a secondary base part, with means for securing the secondary base part to the main base part and also to the guide-bars.

26. In a filing appliance, the combination with a case, guides secured to the case, a plurality of holders hingedly connected together and pivotally supported in the case, and an abutment mounted movably on the guides, of an arm pivotally mounted on the abutment and pivotally connected detachably to one of the holders.

27. In a filing appliance, the combination of a case, a series of holders mounted therein, connections between the holders permitting them to swing relative to each other, the said connections including means permitting the holders to move relatively to each other in a longitudinal direction, means carried by the holders for moving them in one direction, and means carried by the case for moving them in the opposite direction.

28. In a filing appliance, the combination of a case, a series of holders mounted therein, connections between the holders permitting them to swing relative to each other, the said connections including means permitting the holders to move relatively to each other in a longitudinal direction, a projection carried by each holder, means mounted in the case and arranged in the path of movement of said projections for moving the holders longitudinally in one direction, and means mounted in the holders for moving them in the opposite directions.

29. In a filing appliance, the combination of a case, a series of holders mounted therein, connections between the holders permitting them to swing relative to each other, the said connections including means permitting the holders to move relatively to each other in a longitudinal direction, automatic means carried by the holders for moving them in one direction, and means carried by the case for moving them in the opposite direction.

30. In a filing appliance, the combination with a support, of a series of holders, means for supporting one end holder of said series of holders on said support, pivotal connections between the holders whereby they are free to swing from one position to another, the said connections including a series of members, one for each holder except the supported end holder, on which the holders are longitudinally movable toward and from their respective pivots, and a pair of devices arranged on the opposite sides of said holders and engaged simultaneously by each holder as it is moved forwardly for sliding it on the adjacent member.

31. In a filing appliance, the combination with a support, of a series of holders, means for supporting one end holder of said series of holders on said support, pivotal connections between the holders whereby they are free to swing from one position to another, the said connections including a series of members, one for each holder except the supported end holder, on which the holders are longitudinally movable toward and from their respective pivots, and a pair of devices arranged on the opposite sides of said holders and engaged simultaneously by each holder as it is moved forwardly for sliding it on the adjacent member, the said devices being engaged by said holders successively.

32. The combination with a support, of a series of holders having connections between them permitting said holders to swing relatively to each other, means for pivotally supporting one end holder of said series of holders on said support, a movable abutment for the opposite end holder, a coupling arm between said abutment and the adjacent end holder, and means for supporting said arm on the abutment and permitting it to move pivotally and longitudinally.

33. The combination with a support, of a series of holders, a longitudinal movable guide bar carried by each holder, yieldable means interposed between each holder and the adjacent guide bar, pivotal connections between each guide bar and the adjoining holder, whereby adjoining holders may swing relatively to each other, and means for adjusting the tension of the yielding means for each holder independently of the remaining holders.

In testimony whereof, I affix my signature in presence of two witnesses.

ELLIS T. SILVIUS.

Witnesses:
HARRY D. PIERSON,
J. H. GARDNER.

Copies of this patent may be obtained for five cents each, by addressing the "Commissioner of Patents Washington, D. C."